US012032627B2

United States Patent
Li et al.

(10) Patent No.: US 12,032,627 B2
(45) Date of Patent: Jul. 9, 2024

(54) HYBRID TRANSFORMER-BASED DIALOG PROCESSOR

(71) Applicant: Microsoft Technology Licensing, LLC, Redmond, WA (US)

(72) Inventors: Jinchao Li, Redmond, WA (US); Lars H. Liden, Seattle, WA (US); Baolin Peng, Bellevue, WA (US); Thomas Park, Seattle, WA (US); Swadheen Kumar Shukla, Kirkland, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 17/526,806

(22) Filed: Nov. 15, 2021

(65) Prior Publication Data
US 2023/0153348 A1 May 18, 2023

(51) Int. Cl.
*G06F 16/60* (2019.01)
*G06F 16/63* (2019.01)
*G06N 20/00* (2019.01)

(52) U.S. Cl.
CPC ............ *G06F 16/63* (2019.01); *G06N 20/00* (2019.01)

(58) Field of Classification Search
CPC .... G06F 16/63; G06F 16/90332; G06N 20/00
See application file for complete search history.

(56) References Cited

U.S. PATENT DOCUMENTS

| 2018/0144738 | A1* | 5/2018 | Yasavur | ............ G06F 16/90332 |
| 2020/0302019 | A1* | 9/2020 | Hall | ................. G10L 15/22 |
| 2020/0334568 | A1* | 10/2020 | Liden | ................ G06F 3/0482 |
| 2020/0342874 | A1* | 10/2020 | Teserra | ................ G06F 40/35 |

(Continued)

FOREIGN PATENT DOCUMENTS

CN 111930884 A 11/2020

OTHER PUBLICATIONS

Article entitled "HyKnow: End-to-End Task-Oriented Dialog Modeling with Hybrid Knowledge Management", by Gao et al., Jun. 2, 2021 (Year: 2021).*

(Continued)

*Primary Examiner* — Mahesh H Dwivedi

(57) ABSTRACT

Systems and methods are provided for determining a response to a query in a dialog. An entity extractor extracts rules and conditions associated with the query and determines a particular task. The disclosed technology generates a transformer-based dialog embedding by pre-training a transformer using dialog corpora including a plurality of tasks. A task-specific classifier generates a first set of candidate responses based on rules and conditions associated with the task. The transformer-based dialog embedding generates a second set of candidate responses to the query. The classifier accommodates changes made to a task by an interactive dialog editor as machine teaching. A response generator generates a response based on the first and second sets of candidate responses using an optimization function. The disclosed technology leverages both a data-driven, generative model (a transformer) based on dialog corpora and a user-driven, task-specific rule-based classifier that accommodating updates in rules and conditions associated with a particular task.

20 Claims, 9 Drawing Sheets

(56) References Cited

U.S. PATENT DOCUMENTS

2021/0312904 A1* 10/2021 Shukla ...................... G06F 8/38
2021/0326751 A1* 10/2021 Liu ........................ G06N 3/084
2022/0103491 A1* 3/2022 Yang ...................... G06F 40/35

OTHER PUBLICATIONS

Article entitled "Soloist: Few-shot Task-Oriented Dialog with a Single Pre-trained Auto-regressive Model", by Peng et al., dated Jun. 22, 2020 (Year: 2020).*
Article entitled "A Hybrid Retrieval-Generation Neural Conversation Model", by Yang et al., dated Nov. 7, 2019 (Year: 2019).*
"International Search Report and Written Opinion Issued in PCT Application No. PCT/US22/047951", Mailed Date: Jan. 20, 2023, 11 Pages.

* cited by examiner

300

Dialog History 302 (for pre-training the transformer)
*User*: I would like to find an expensive restaurant that serves Chinese food.
*System*: Sure. Which area do you prefer?
*User*: How about in the north part of town.
*System*: The Peony Kitchen is a great place.

Belief State 304 (for pre-training the transformer)
Restaurant {
    pricerange = expensive,
    food = Chinese,
    area = north
}

Database 306 (for pre-training the transformer)
Restaurant 1 match. (a restaurant database)

Query 308
Reserve a table at a good Chinese restaurant in town to go among five of us.

Rules and Conditions 310 (for fine-tuning the classification layer and for inference)
Available Actions 312: Never ask a type of food and a number of people again as Chinese as a type of food and five as a number of people in the party are specified.
Attribute 314: Food: Chinese, #guests: five
Entity 316: food type, a number of guests, a restaurant, ...
Bag of Words 318: "reserve," "a table," "good," "Chinese," " restaurant"...
Last Action 320: Search for a restaurant,
New Dialog 322: None Candidate Responses 324
A) The Peony Kitchen is a fancy Chinese food restaurant. Would you like to book a table for five there?
B) Anything else?
C) How many people are in your party?

Response 326:
The Peony Kitchen is a fancy Chinese food restaurant. Would you like to book a table for five at the Peony Kitchen?

FIG. 3

HYBRID TRANSFORMER-BASED DIALOG PROCESSOR

BACKGROUND

As use of digital assistants has become commonplace, the importance of accurately and promptly responding to queries has increased. In addition, dialog processing systems host an increasing number of bots (e.g., digital assistant applications) to process dialogs with respective users over a network. In some examples, the dialog processing systems use a set of rules and conditions for determining a response to a query for performing a task. In other examples, systems use a data-driven model (e.g., a transformer model) that predicts a response to a query by learning from a dialog history.

In a rule-driven system, issues arise because the number of rules and conditions must increase as the queries to digital assistants are directed to ever-broadening subject matter. Maintaining integrity and consistency of the rules and conditions becomes complex as the number of rules and conditions increases. Additionally, the rules and conditions must be updated over time as policies associated with tasks evolve over time. As a result, rule-driven systems require a high level of administrative oversight and management, reducing efficiency. In contrast, use of pre-trained, data-driven generative models (e.g., transformers) enables a system to be responsive to queries against multiple tasks. However, the models may be slow to respond to changing policies and broadening subject matter because time-consuming and data-heavy re-training of the models may be required, reducing accuracy in the interim. Accordingly, there arises a tension between accuracy and efficiency in processing queries and generating responses in dialog systems. A system that better meets both accuracy and efficiency would be desirable.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a system for generating responses to queries in a dialog processor. In particular, the present disclosure generates candidate responses to queries using a transformer-based dialog embedding and a rule-based classifier. The disclosed technology pre-trains the transformer-based dialog embedding using dialog history data. The dialog history data includes dialog data covering multiple tasks. The dialog policy database includes records that are searchable based on the content of queries in dialogs. A classification layer fine-tunes the transformer-based dialog embedding based on task-specific rules and conditions. The classification layer includes rules and conditions associated with particular tasks based on an interactively created dialog tree that is editable via a user interface. Using the dialog editor, the rules and conditions (e.g., policies) associated with specific tasks can be easily and efficiently updated by a developer or administrator.

Thus, the disclosed system combines a transformer-based layer, which is shared among bots across multiple tasks, and a task-specific, a rule-based classification layer. A pre-training of the transformer generates a transformer-based embedding that generates one or more candidate responses to a query. The rule-based classification layer determines another set of candidate responses to the query based on a set of rules and conditions associated with a specific task. A normalizer infers a response to the query by determining a weighted sum (or softmax) and generating a combined list of weighted candidate responses. A response generator selects the response from the weighted candidate responses.

Some examples include a method for determining a response to a query in a dialogs. The method may include receiving a query, wherein the query is a part of a dialog associated with a task, predicting, based on the query, a first candidate response to the query using a dialog embedding associated with a first model, wherein the first model includes a data-driven, pre-trained generative model, predicting, based on the query, a second candidate response to the query using a second model, wherein the second model includes a classifier, determining, based on a combination of the first candidate response and the second candidate response, a response to the query, and transmitting the response as a next action in the dialog.

The method may further include pre-training the first model using dialog corpora, wherein the dialog corpora includes a plurality of dialog data associated with a plurality of tasks, and wherein the first model includes a transformer, generating, based on the pre-trained first model, the dialog embedding, and generating, based on a combination of the query and the dialog embedding, the first candidate response to the query. The method may yet further include receiving a dialog tree, wherein the dialog tree includes at least one of a rule or a condition associated with the task, and wherein the dialog tree is editable, training, using the at least one of a rule or a condition associated with the task, the second model, and generating, based on a combination of the query and the at least one of the rule or the condition associated with the task, the second candidate response.

The first model includes at least part of a transformer. The second model includes at least a rule and a condition associated with the task. The method may further include extracting one or more rules from the query, wherein the one or more rules include one or more of: an available action, a property, an entity, a bag of words, a last action, and a new dialog, and generating, based on the one or more rules, the second candidate response to the query using the second model. The dialog embedding includes a transformer-based dialog embedding, wherein the transformer-based dialog embedding is based on dialog history data for a plurality of tasks, and wherein the second model is specific to the task. The rule or condition associated with the task is interactively generated based on machine teaching.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3 illustrates an exemplary data structure associated with task rules and conditions in accordance with aspects of the present disclosure.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Dialog processing systems need to determine a next action as a response to a received query. In aspects, the next action should satisfy a set of rules and conditions for performing a specific task, where the rules and conditions may change over time. However, rule-based systems are clunky and require extensive user interaction to maintain and update the rules in response to changing policies and expanding query scenarios. The system furthermore needs to be robust in accommodating a wide variety of natural-language expressions used in the received query. Traditional data-driven dialog management systems may be trained to understand natural language queries, manage knowledge, and generate a natural language response. However, such data-driven systems are slow to accommodate changing rules and conditions.

As discussed in more detail below, the present disclosure is directed to generating responses to queries by combining a data-driven, generative model with a user-driven, classification model. The disclosed technology includes training and using a transformer and a classifier. In aspects, the system includes a combination of a shared task-agnostic transformer-based layer and a task-specific rule-based classification layer. The transformer-based shared layer is pre-trained using dialog history data from bots as training data and fine-tuned by the task-specific rule-based classification layer. The task specific rule-based classification layer includes an entity extractor and a dialog retriever and determines a candidate response based on a set of rules and conditions to perform a task. A task-specific classifier receives an update to a dialog tree from an interactive dialog editor with a user interface. By combining and weighting candidate responses from the shared task-agnostic transformer-based dialog embedding and the task-specific rule-based classifier, the disclosed technology is able to generate a response that is accurate in an efficient manner.

Figure 1:
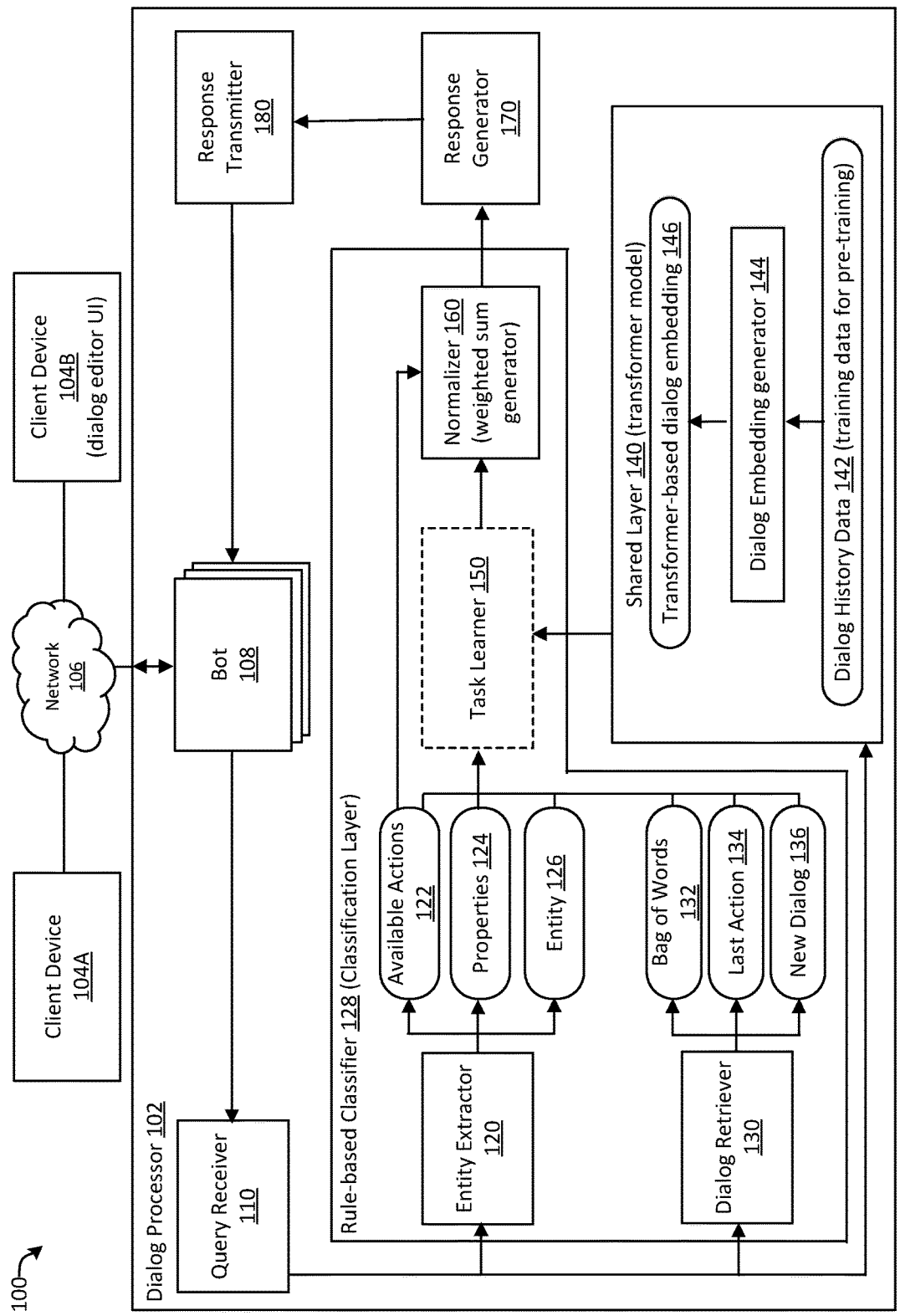
FIG. 1 illustrates an overview of an example system generating a response to a query in accordance with aspects of the present disclosure.

FIG. 1 illustrates an overview of an example system for generating a response to a query in accordance with aspects of the present disclosure. The system 100 includes a dialog processor 102, client devices 104A-B, and a network 106. The dialog processor 102 includes a bot 108, a query receiver 110, a rule-based classifier 128 (i.e., a classification layer), a shared transformer-based layer 140, a normalizer 160 (e.g., a weighted sum generator), a response generator 170, and a response transmitter 180.

The client device 104A interacts with a user who communicates with the bot 108 over the network 106. In particular, the bot 108 may be a digital assistant that receives a query from the user. The bot 108 may respond by sending a response to the query to the user via the client device 104A. In contrast, the client device 104B may interact with a developer who designs a dialog scenario for a specific task. In particular, the client device 104B may provide a user interface associated with a dialog editor to enable the developer to manually review and edit dialog data (e.g., the query and response produced by the user and the bot 108). The edited dialog data represents true data for training the rule-based classifier 128 for the specific task. In this way, the rules and conditions (e.g., policies) associated with specific tasks can be easily and efficiently updated by a developer or administrator.

In an example, the bot 108 interactively performs a dialog with a user using the client device 104A over the network 106. The bot 108 receives queries and sends responses to the queries. In some aspects, the bot 108 may transmit a query (i.e., ask a clarification question) to the user, soliciting an answer to the query. In aspects, a dialog includes one or more queries and responses between the bot and the user. The rule-based classifier 128 determines a first set of one or more candidate responses based on a set of rules and conditions associated with a specific task (e.g., trained based on edited dialog data for the specific task). The shared transformer-based layer 140 determines, based on the received query, a second set of one or more candidate responses using a transformer-based embedding. In aspects, first candidate responses may be the same and/or different from second candidate responses. As detailed below, the transformer-based embedding may be produced by a transformer that is pre-trained using dialog history data. The rule-based clarification layer is fined-tuned to the specific tasks based on a combination of the transformer-based embedding and rule-based properties of the specific tasks.

A combination of the shared transformer-based layer 140 and the rule-based classifier 128 generates first and second candidate responses to the received query. The normalizer 160 normalizes attributes of the first and second sets of candidate responses by applying a weighted sum and determines a list of normalized candidate responses. The response generator 170 determines and/or generates a response in a natural language form. The response transmitter 180 transmits the response to the bot 108 for the bot 108 to respond to the query using the generated natural-language response.

The rule-based classifier 128 includes an entity extractor 120, a dialog retriever 130, and a multi-task learner 150. The entity extractor 120 extracts from the query one or more entities, rules, and conditions associated with the query. In particular, the entity extractor 120 extracts at least an entity 126, properties 124, and one or more available actions 122. In aspects, the entity 126 indicates an attribute associated with a specific task (e.g., making a reservation at a restaurant). The properties 124 may indicate one or more properties associated with the specific task (e.g., date, time, number in party, indoor or patio, etc.) to be satisfied in a response. The one or more available actions 122 indicate actions that are available to undertake as a response based on the extracted entity and properties. In an example, asking for a number of people in a party in reserving a table at a restaurant may be excluded as an available action when the bot 108 has already received the information (e.g., property) as a part of the dialog. In aspects, the rule-based classifier 128 stores the available actions 122, the properties 124, and the entity 126 in an entity memory (not shown in FIG. 1).

The dialog retriever 130 retrieves rules and conditions associated with the received query for the specific task. The dialog retriever 130 determines a bag of words 132, a last action 134, and a new dialog 136. The bag of words includes words in dialog data associated with the specific task. The last action 134 indicates at least an action performed by a previous response in the specific task as performed by the bot. A new dialog 136 indicates a new dialog associated with the specific task.

In aspects, the rule-based classifier 128 (i.e., the classification layer) may include a machine-learning model for inferring a response to a received query based on rules and conditions associated with a specific task. The machine-learning model in the classification layer may include but is not limited to a weighted sum, an optimization function, a softmax, and/or a neutral network that predicts likelihood of a response as a next action to a query.

The disclosed technology executes in at least two modes of operation: training and inferencing. The training includes pre-training of the shared transformer-based layer 140 (e.g., the transformer model) and training of the rule-based classifier 128 (e.g., the classification layer). The training of the rule-based classifier 128 may represent a fine-tuning of the transformer model. The fine-tuning raises a level of accuracy in predicting a task-specific response. While training the rule-based classifier 128, the rule-based classifier 128 may receive an update to the rules and conditions associated with the task based on a dialog tree. In aspects, the client device 104 may include a dialog editor with user interface. The user interface enables an operator interactively editing one or more dialog scenarios as machine teaching. A dialog tree captures symbolic information from the user creating a scenario for a dialog. The dialog processor 102 may receive the edited one or more dialog scenarios and update a dialog tree associated with a task. The rule-based classifier 128 may translate the rules and conditions associated with the updated dialog tree into an embedding form of training data. The multi-task learner 150 may then learn the training data to train the classification layer.

The shared transformer-based layer 140 includes a transformer model that is shared among bots across different tasks. The shared transformer-based layer 140 includes dialog history data 142, a dialog embedding generator 144, and a transformer-based dialog embedding 146. In aspects, the shared transformer-based layer 140 pre-trains the transformer model (i.e., the transformer-based dialog embedding 146) using the dialog history data 142 as training data. The dialog history data 142 includes data associated with dialogs held by the bot 108. In aspects, the dialog history data 142 is an aggregate of dialog data across different tasks and subject matter. The dialog embedding generator 144 may generate the transformer-based dialog embedding 146 during the pre-training. In aspects, the transformer-based dialog embedding 146 embeds within dialog history data 142. In contrast to word-by-word embeddings that may be used for natural language understanding, the transformer-based dialog embedding 146 in the present disclosure embeds dialog data. As an example, the dialog data may include queries and responses exchanged between bots and users.

In aspects, the disclosed technology may include one or more layers of a transformer model. For example, while some systems may include six layers of encoders and decoders in a transformer model, the disclosed technology may include fewer layers, such as three layers including the classification layer. In this way, the disclosed technology may conserve both processing and memory resources while still providing an accurate embedding. In aspects, the disclosed technology uses a transformer-based dialog embedding as output from the transformer model. The classification layer may be fine-tuned to be task-specific by using a set of rules and conditions associated with specific tasks as training data. Some traditional natural language systems use a transformer for natural language inferencing at sentence level for generating a sentence based on sentence corpora including words used. Rather, the disclosed technology pre-trains the transformer model based at least on dialog history data for natural language inferencing at a dialog level. The dialog history data may include sets of sentences during an interactive conversation.

The normalizer 160 normalizes the transformer-based dialog embedding 146 and an embedding associated with the rule-based classifier 128. The normalizer 160 may rank the candidate responses in the combined first and second sets of candidate responses based on a weighted sum and/or softmax of parameters associated with respective candidate responses. The normalizer 160 may use the available actions 122 as a mask to determine candidate responses to the query. In aspects, the normalizer 160 may weigh the rules and conditions associated with the particular task as a gold rule over candidate responses as generated based on a dialog corpora using the transformer-based dialog embedding 146.

The response generator 170 determines and/or generates a response to the received query. In aspects, the response generator 107 selects a response from the ranked list of candidate responses. In aspects, candidate responses may be ranked according to a likelihood of being a correct response to the query. The ranking may be based on a combination of rules and/or conditions associated with a specific task and dialog history data across tasks.

The response transmitter 180 transmits the response to the bot 108. The bot 108 may transmit the response to the client device 104A over the network as a response to a previously received query.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
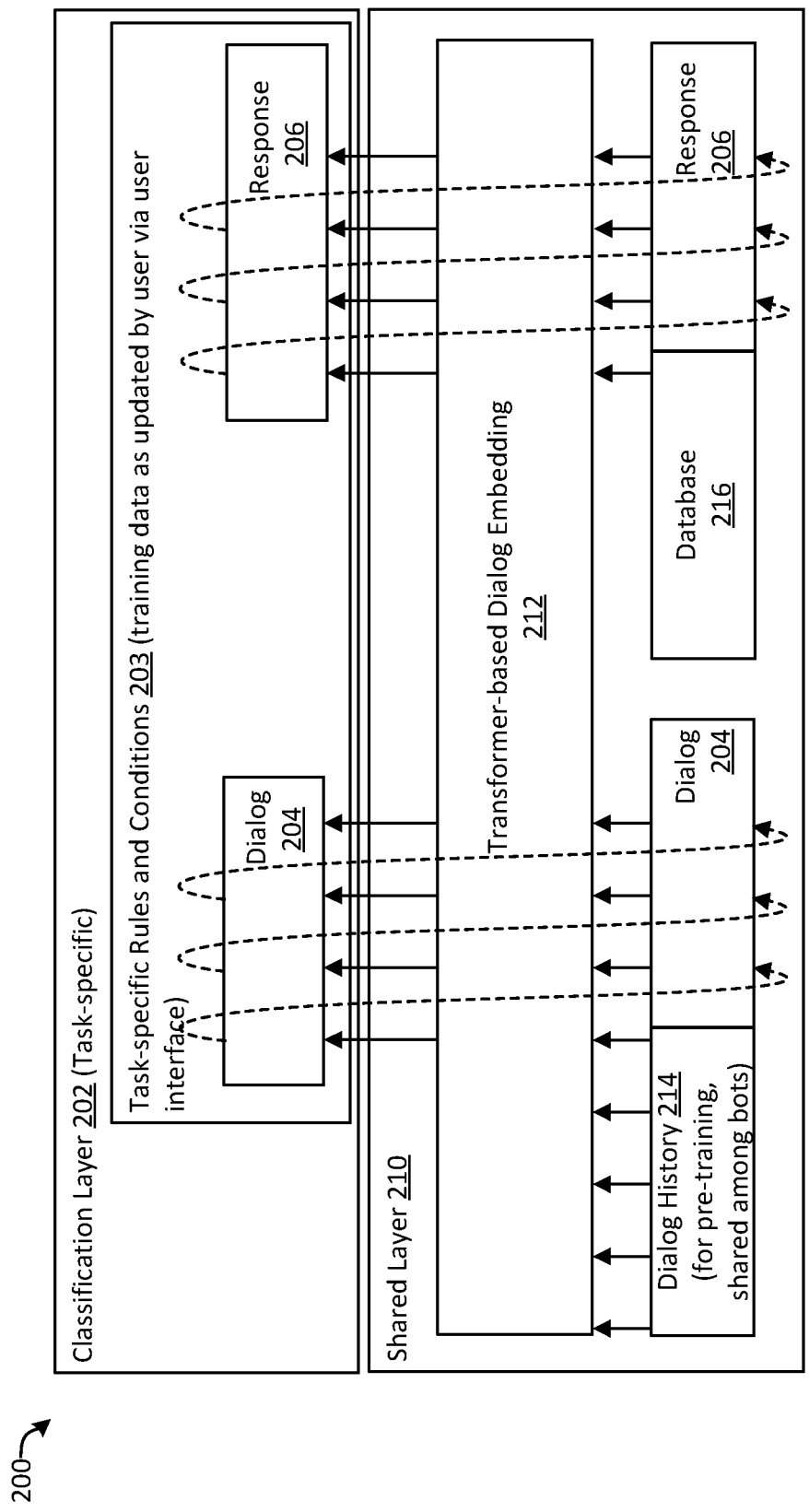
FIG. 2 illustrates an example system of generating a response to a query in accordance with aspects of the present disclosure.

FIG. 2 illustrates an example data structure in accordance with aspects of the present disclosure. FIG. 2 includes a data structure 200 that trains a classification layer 202 and a shared layer 210. The classification layer 202 includes a classification model based on rules and conditions associated with a specific task. In aspects, the classification layer 202 is trained based on a task-specific set of rules and conditions 203. For example, a task may include making a restaurant reservation. In some aspects, the rules and conditions associated with a task may include but are not limited to available actions, conditions, entities needed, bag of words, a last action taken, and a new dialog. In aspects, the classification layer 202 may translate a dialog tree into the rules and conditions in an embedded form.

The shared layer 210 includes a transformer-based dialog embedding 212, a dialog history 214, a database 216, the dialog 204, and the response 206. The dialog history 214 includes data associated with dialogs that have taken place. The dialog history includes dialog data from multiple bots across tasks. The dialog history 214 is used as training data for pre-training the transformer-based dialog embedding 212. The database 216 includes entities that may be used to replace entity placeholders in de-lexicalized responses (e.g., templates) in generating a response to a query. For example, the database 216 may include names of restaurants with various properties (e.g., location, food type, and the like) associated with respective restaurants.

In aspects, the transformer-based dialog embedding 212 is an output of a transformer model with a reduced number layers excluding some decoders. For example, some traditional transformer models include six layers; the present disclosure may include three layers by using output from the transformer as dialog embeddings. In pre-training the transformer, aspects of the dialog 204 and the response 206 may be back-propagated to the initial layer of the transformer for regression.

As will be appreciated, the various methods, devices, applications, features, etc., described with respect to FIG. 2 are not intended to limit the data structure 200 to be used by the particular applications and features described. Accordingly, additional data configurations may be used to practice the methods and systems herein and/or features and applications described may be excluded without departing from the methods and systems disclosed herein.

FIG. 3 illustrates example data in accordance with aspects of the present disclosure. Data 300 represent a combination of data used under an example task of reserving a table at a restaurant. The data 300 includes a dialog history 302, a belief state 304, a database 306, a query 308, rules and conditions 310, candidate responses 324, and a response 326.

The dialog history 302 includes data associated with dialogs held in the past between bots and users across tasks. For example, dialog history 302 includes a conversation between a user and a system (i.e., a bot): User: "I would like to find an expensive restaurant that serves Chinese food." System: "Sure. Which area do you prefer?" User: "How about in the north part of town." System: "The Peony Kitchen is a great place." In aspects, the dialog history 302 represents training data for pre-training a transformer.

The belief state 304 represents a set of placeholders used to track content of queries received during a dialog. For example, an entity "restaurant" may include its price range (e.g., expensive), food (e.g., Chinese), and area (e.g., north). The belief state 304 is among the inputs to pre-train the transformer.

The database 306 includes a search result based on a received query. For example, the database 306 includes records associated with matching restaurants based on a search using the belief state as conditions.

The query 308 represents a query received from a user. For example, the query may include "Reserve a table at a good Chinese restaurant in town to go among five of us." In aspects, the present disclosure infers a response to the query based on a combination of a rule-based classification and a transformer-based, data-driven generative method.

The rules and conditions 310 include rules and conditions associated with a task. For example, the rules and conditions 310 include available actions 312, an attribute 314, an entity 316, a bag of words 318, a last action 320, and a new dialog 322. In the above example, the system received query 308, which included a type of food ("Chinese") and a number of people (five). In this case, the available actions 312 include not asking a type of food and a number of people again. In some other aspects, the available actions represent a mask to limit candidate responses as inferred by the classification layer. The attribute 314 includes attributes used to infer a response associated with a task. For example, the attribute 314 includes Chinese as a food type and five as a number of guests. The entity 316 includes one or more entities as placeholders and values associated with the placeholders to limit candidate responses. The bag of words 318 includes a collection of words associated with the task. The last action 320 indicates an action that has been taken in a last response to the user. For example, the last action 320 includes searching for a restaurant. The new dialog 322 includes one or more rules and conditions needed to generate a new dialog.

The candidate responses 324 includes a list of candidate responses for responding to a query. For example, the candidate responses 324 includes three candidates: A) "The Peony Kitchen is a fancy Chinese food restaurant. Would you like to book a table for five there?" B) "Anything else?" C) "How many people are in your party?" In aspects, the classification layer may generate the candidate responses 324 by combining the task-specific, rule-based classification and the transformer-based dialog embedding. The list of candidate responses may be ranked based on affinity to the rules and conditions, or filtered based on the available actions 312 as a mask.

The response 326 includes a response to the query. For example, the response 326 includes: "The Peony Kitchen is a fancy Chinese food restaurant. Would you like to book a table for five at the Peony Kitchen?" In aspects, the response 326 may include an action of confirming a restaurant, without inserting more questions about missing parameters (e.g., date/time). In some aspects, the response 326 is based on the available actions 312. For example, the response 326 does not ask a type of food or a number of guests but includes values (e.g., Chinese food, five people). In aspects, the present disclosure does not limit itself to processing dialogs on restaurants. The present disclosure may include other subject matter including but not limited to an insurance bot. For example, the insurance bot may create a new insurance policy, obtain information associated with existing policies, insurance rates, types of insured properties (e.g., motorcycle, cars, a house, and the like), and types of policies (e.g., comprehensive, liability, and the like).

Figure 4:
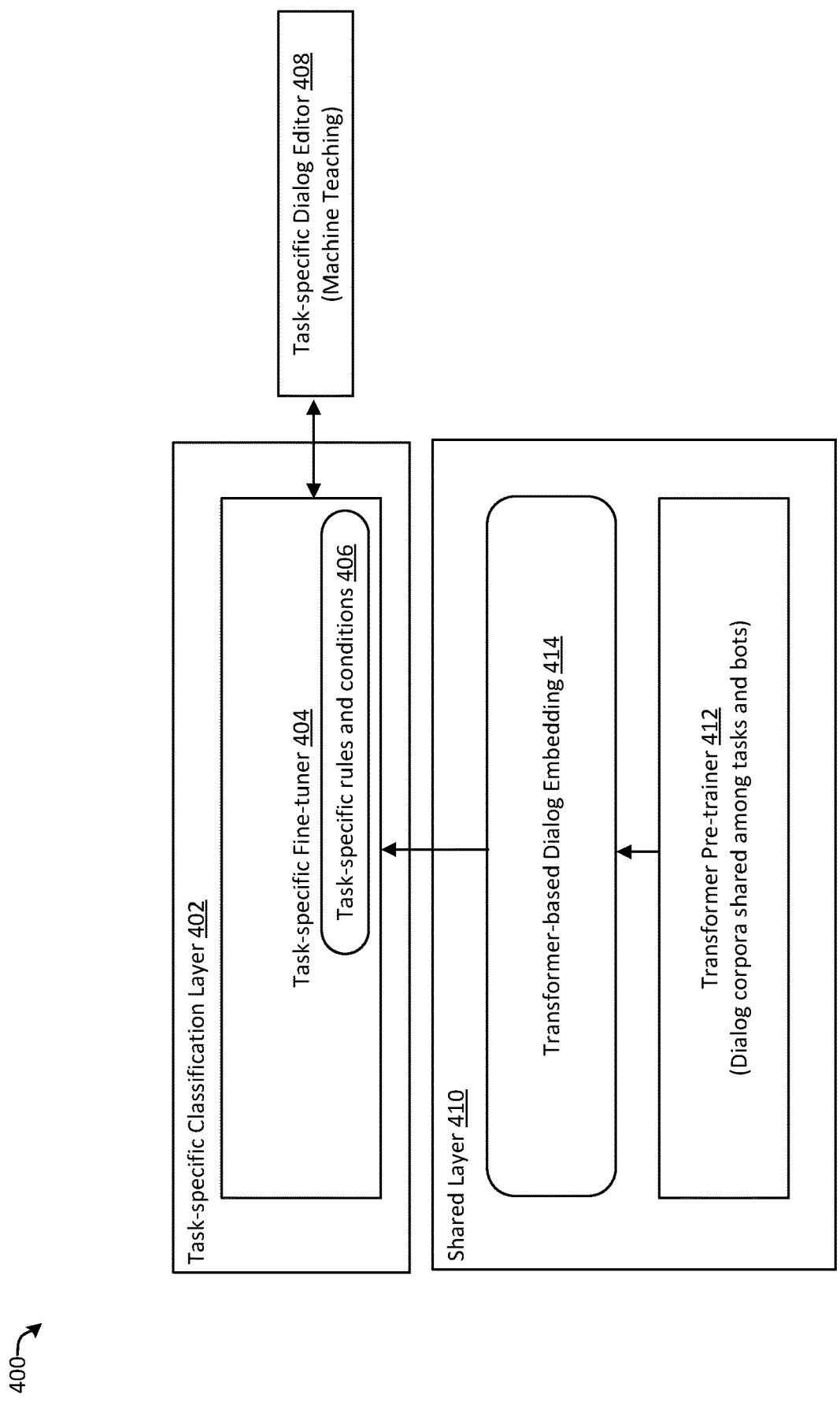
FIG. 4 illustrates an exemplary system of training models for generating a response to a query in accordance with aspects of the present disclosure.

FIG. 4 illustrates an example system for training layers of models in accordance with aspects of the present disclosure. In aspects, the present disclosure includes two types of training. First is to train a user-driven, rule-based classification model using rules and conditions associated with a task as training data. Second is to train a data-driven, transformer model using dialog corpora as training data.

System 400 includes a task-specific classification layer 402, a shared layer 410, and a task-specific dialog editor

408. The task-specific classification layer 402 includes a task-specific fine-tuner 404. The task-specific fine-tuner trains the classification model based on a task-specific rules and conditions 406.

The task-specific dialog editor 408 includes a user interface to interactive receive data associated with a dialog from a user. In aspects, the task-specific dialog editor 408 generates a dialog tree that includes rules and conditions associated with a dialog associated with a task. The task-specific fine-tuner 404 translates the dialog tree into an embedding and stores the embedding as the task-specific rules and conditions 406.

The shared layer 410 includes a transformer pre-trainer 412 and a transformer-based dialog embedding 414. In aspects, the transformer pre-trainer 412 uses dialog corpora (i.e., data that represents dialog history, shared across bots). The transformer pre-trainer 412 pre-trains a transformer. The transformer is an example of a data-driven, dialog-based (i.e., pre-trained using dialog corpora), task-agnostic (i.e., independent of a specific task), generative model that generates a response to a query in a dialog. Additionally or alternatively, the present disclosure may use a model that is not a transformer but another data-driven, dialog-based, generative model. The transformer pre-trainer 412 outputs the transformer-based dialog embedding 414. In aspects, the transformer-based dialog embedding 414 is agnostic to a specific task. The transformer-based dialog embedding 414 encapsulates historical data associated with dialogs performed by bots including various tasks and entities that appeared in dialogs in the past.

In aspects, the pre-training and/or the fine-tuning may take place off-line, non-synchronous to bots interacting with users. The pre-training may be more resource intensive than the fine-tuning. The fine-tuning may take place when a user modifies a dialog associated with a task. By separating timings of the pre-training and the fine-tuning, the present disclosure efficiently combines a user-driven, classification model that accommodates frequent updates in dialogs with a data-driven, generative model that includes dialog corpora that cover multiple tasks.

Figure 5:
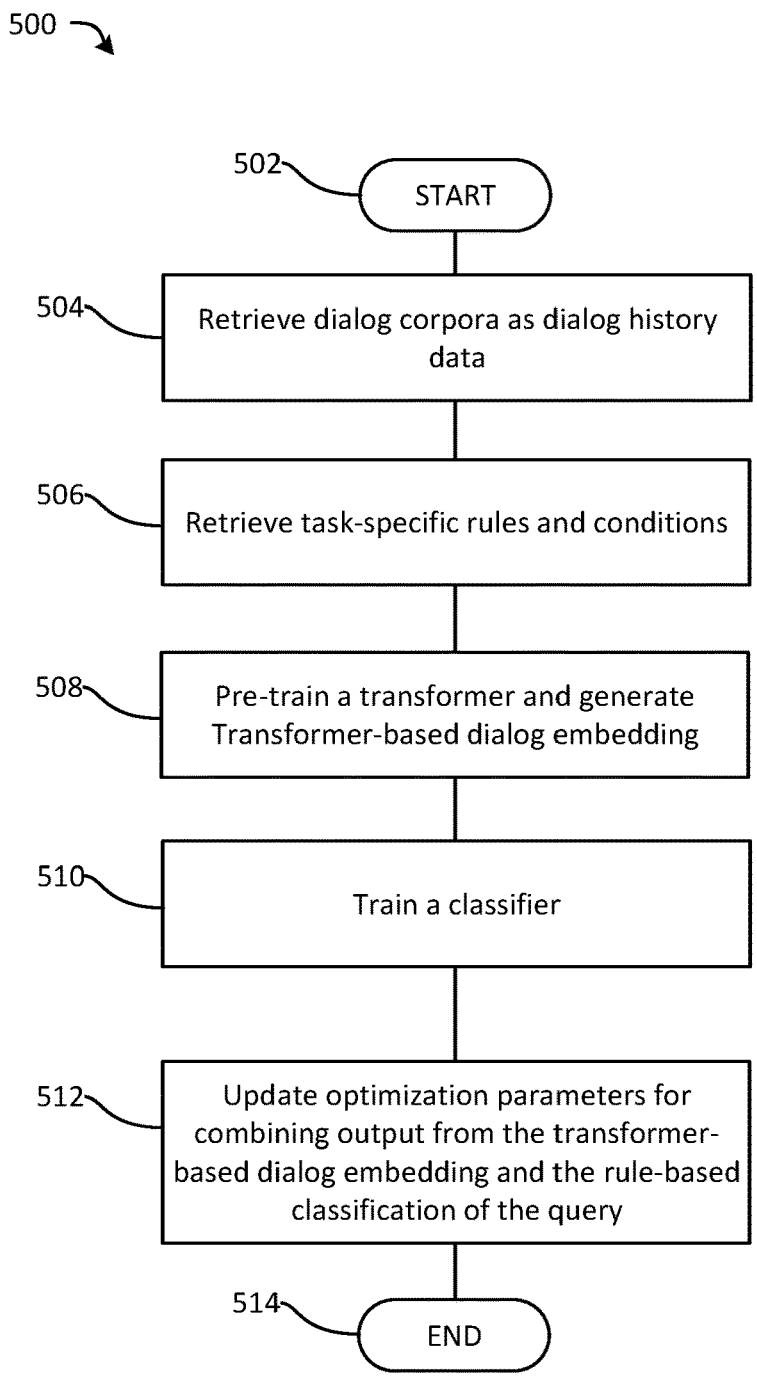
FIG. 5 illustrates an example of a method for training models in accordance with aspects of the present disclosure.

FIG. 5 illustrates an example of a method for training models associated with generating a response to a query in accordance with aspects of the present disclosure. A general order of the operations for the method 500 is shown in FIG. 5. Generally, the method 500 begins with start operation 502 and ends with end operation 514. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4, 6, 7, and 8A-B.

Following start operation 502, the method 500 begins with a retrieve dialog corpora operation 504, which retrieves dialog corpora as dialog history data. In aspects, the dialog corpora include data across multiple tasks, performed by one or more bots.

A retrieve rules operation 506 receives rules and conditions associated with a particular task. In aspects, the retrieve rules operation 506 may receive a dialog tree associated with the particular task and translate the dialog tree into a set of rules and conditions in an embedded form. The disclosed technology may provide a user interface for a user to interactively create and edit a dialog as machine teaching. The dialog tree may reflect a knowledge of the user.

A pre-train operation 508 pre-trains a transformer and generates a transformer-based dialog embedding. In aspects, the pre-train operation 508 uses the dialog corpora including multiple tasks as training data. The pre-train operations 508 pre-trains the transformer based on dialogs between bots and users for managing a dialog. The pre-train operation 508 using dialog history data is in contrast to training a transformer for inferring a sentence using a bag of words and training sentences. Additionally, the pre-train operation 508 may use a database associated with performing tasks and belief states as training data. The pre-training of the transformer generates a transformer-based dialog embedding. The transformer-based dialog embedding captures data associated with dialogs that have taken place to perform tasks. In some aspects, the transformer-based dialog embedding represents data without being decoded in the transformer. In aspects, the disclosed technology uses the transformer-based dialog embedding (e.g., without being decoded) as input to the task-specific classifier.

A train operation 510 trains a classifier. The classifier represents a user-driven, classification model based on rules and conditions associated with a particular task. In aspects, the train operation 510 trains a classification mode based on the task-specific rules and conditions retrieved by the retrieve rules operation 506 as training data.

An update operation 512 updates parameters associated with optimizing a normalization process for inferring a response to a query. In particular, the normalization process combines output from the transformer-based dialog embedding and the rule-based classification of the query. In aspects, the update operation 512 updates one or more weight values associated with generating a weighted sum based on embedded data from the transformer-based dialog embedding and the embedded form of rules and conditions for a task. The method 500 ends with end operation 514.

As should be appreciated, operations 502-514 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
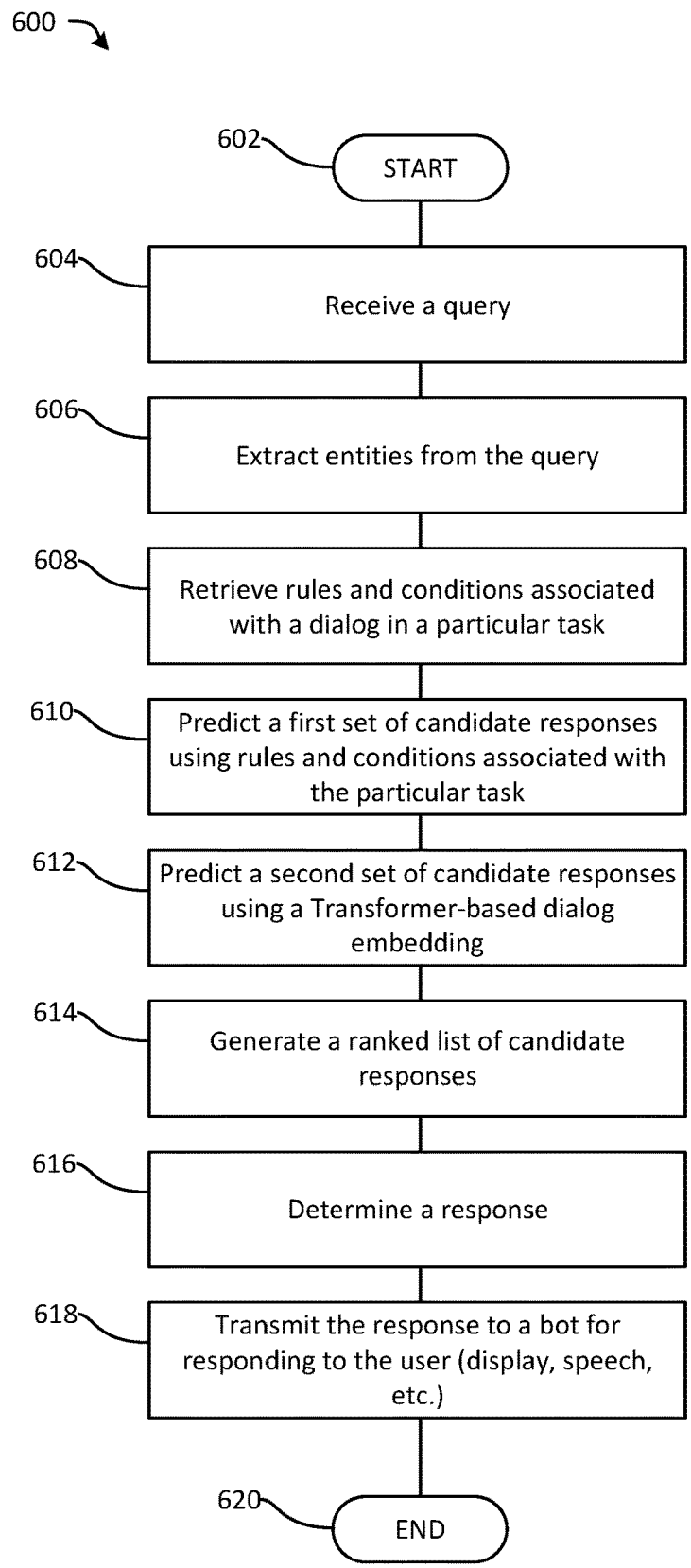
FIG. 6 illustrates an example of a method for generating a response to a query in accordance with aspects of the present disclosure.

FIG. 6 illustrates an example of a method for generating a response to a query in a dialog in accordance with aspects of the present disclosure. A general order of the operations for the method 600 is shown in FIG. 6. Generally, the method 600 begins with start operation 602 and ends with end operation 620. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3A-B, 4, 5, 7, and 8A-B.

Following start operation 602, the method 600 begins with receive operation 604, which receives a query. In aspects, the receive operation 604 receives the query from a bot (e.g., the bot 108 as shown in FIG. 1), which received the query from a user using the client device (e.g., the client device 102 as shown in FIG. 1) in a dialog with the bot.

An extract operation 606 extracts one or more entities from the query. In aspects, the extract operation 606 may include one or more natural language processors, including a natural language understanding system, a knowledge management system, and a natural language generating system. In aspects, the extract operation 606 extracts the one or more entities from the query for determining contexts and semantics of a dialog associated with a particular task.

A retrieve operation 608 retrieves rules and conditions associated with the particular task. In aspects, the retrieve operation 608 retrieves the rules and conditions from a classification model. In some aspects, the classification model is task-specific. Training of the classification layer may include generating training data based on interactively revising rules and conditions through machine teaching and/or manual editing.

A predict a second set of candidate responses operation 610 predicts a first set of one or more candidate responses using rules and conditions associated with the particular task. In aspects, the rules and conditions may include but not limited to available actions as a response to the query, conditions, entities, a bag of words, a last action taken place, and a new dialog. The predict the second candidate response operation 612 uses a user-driven, task-specific classifier for predicting a response. In aspects, the first set of one or more candidate responses includes one or more scores of actions that are possible based on the rules and conditions associated with the particular task.

A predict a second set of candidate response operation 612 predicts a first set of one or more candidate responses to the query using a transformer-based dialog embedding for classification. In aspects, the transformer-based dialog embedding is pre-trained as a task-independent, data-driven, generative model using dialog corpora. Additionally or alternatively, the present disclosure may use any data-driven, generative model that generates dialog embedding, not limited to a transformer. The transformer layer generates a transformer-based dialog embedding that includes an inferencing model that captures dialog history data. The transformer-based dialog embedding may be shared among tasks. The classification layer may classify the query based on a combination of task-specific rules and conditions, properties extracted from the query, and the transformer-based dialog embedding. In aspects, the second set of one or more candidate responses includes one or more scores of actions that are possible based on the transformer-based dialog embedding.

A generate a ranked list operation 614 generates a ranked list of candidate responses. In aspects, the generate a ranked list operation 614 generates the list by combining the first set of one or more candidate responses and the second set of one or more candidate responses. The generate a ranked list operation 614 may rank respective candidate responses based on an optimization function (e.g., weighted sum, softmax, or normalization of actions). Additionally or alternatively, the generate operation may use available actions as a mask in generating the list. The generate a ranked list operation 614 may exclude candidate responses that the available actions does not allow. For example, the available actions may include never asking a type of restaurant food when the system has already received a property or attribute associated with a type of restaurant food. When the previous query already includes "Chinese" as a type of food to search a restaurant, the available actions recites never to ask a food type when already given. Accordingly the generate a ranked list operation 614 may, for example, exclude a response (e.g., a follow-up question by the bot) "what type of food would you like to eat?"

A determine operation 616 determines and/or generates the response to the query. In aspects, the determine operation 616 may select a response from the list of candidate responses. In some aspects, the determine operation 616 may normalize aspects of candidate responses by determining a weighted sum, a softmax, or other optimization functions. In aspects, the determine operation 616 may determine the second candidate as the response when the particular task includes rules and conditions for responding to the query, thereby weighing more on the rules and conditions than the transformer-based dialog embedding that captures dialog history data (i.e., the gold rule). In some other aspects, the determine operation 616 may determine the response to the query based on a weighted sum (i.e., the additive approach) of the first candidate response based on the transformer-based dialog embedding and the second candidate response based on a task-specific classification. The weighted sum may include a weight on an available action as a next action. When there is no rules and conditions associated with the task in responding to the query, the determine operation 616 may use a candidate response as predicted by the transformer-based dialog embedding. Additionally or alternatively, the determine operation 616 may use available actions (e.g., the available actions 122 as shown FIG. 1) as a mask to exclude one or more candidate responses. The determine operation 616 may use a natural language processor to generate the response in text in a natural language form.

A transmit operation 618 transmits the response to the bot. The bot may in turn transmit the response to the user using the client device. In aspects, the bot may be co-residing in a same server as the dialog processor. In some aspects, the transmit operation 618 may transmit the response as one or more of a text and/or audio. The method 600 ends with an end operation 620.

As should be appreciated, operations 602-620 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
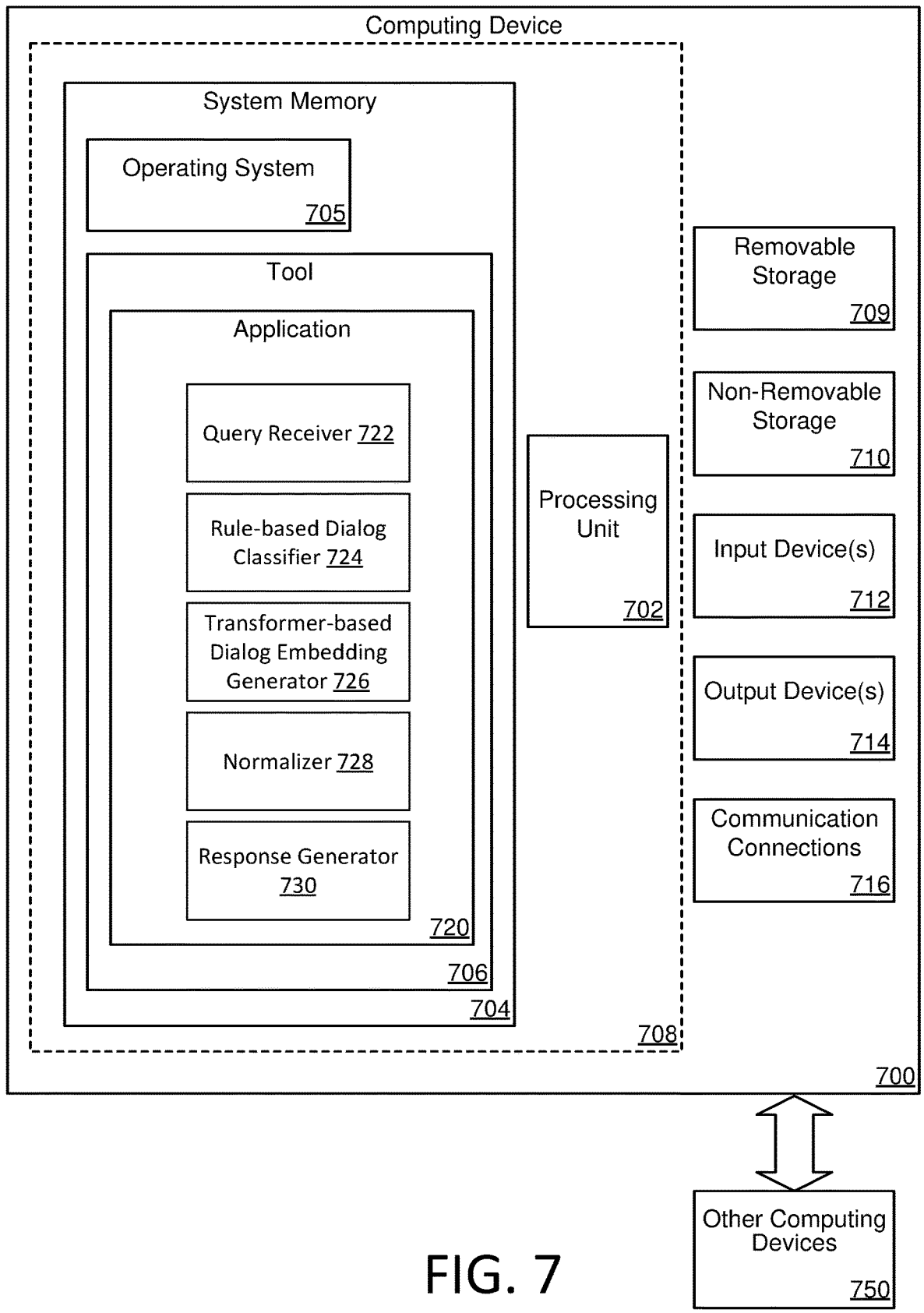
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system.

This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a query receiver 722, a rule-based dialog classifier 724, a transformer-based dialog embedding generator 726, a normalizer 728, and a response generator 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
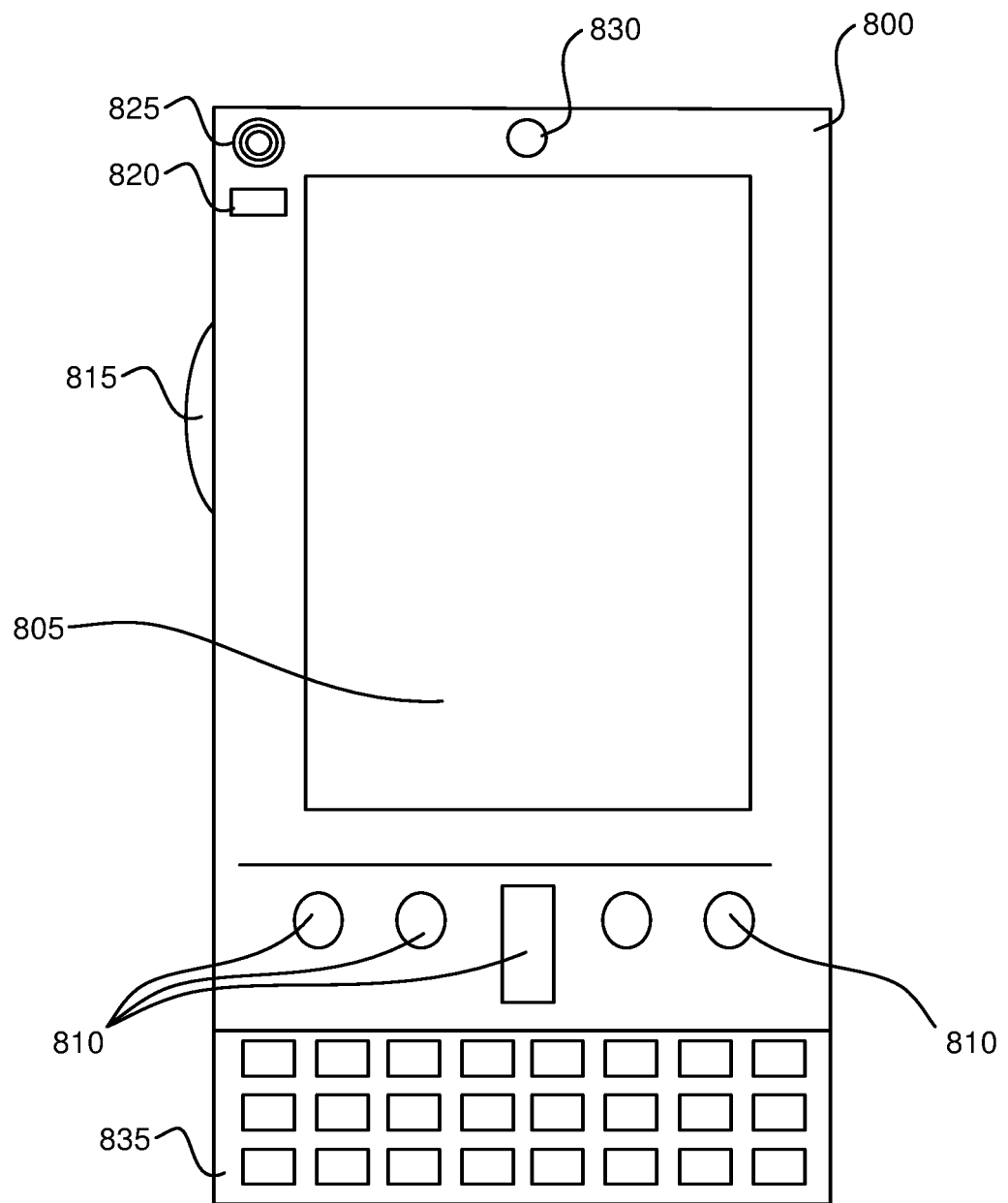
FIG. 8A is a simplified diagram of a mobile computing device with which aspects of the present disclosure may be practiced.
Figure 8B:
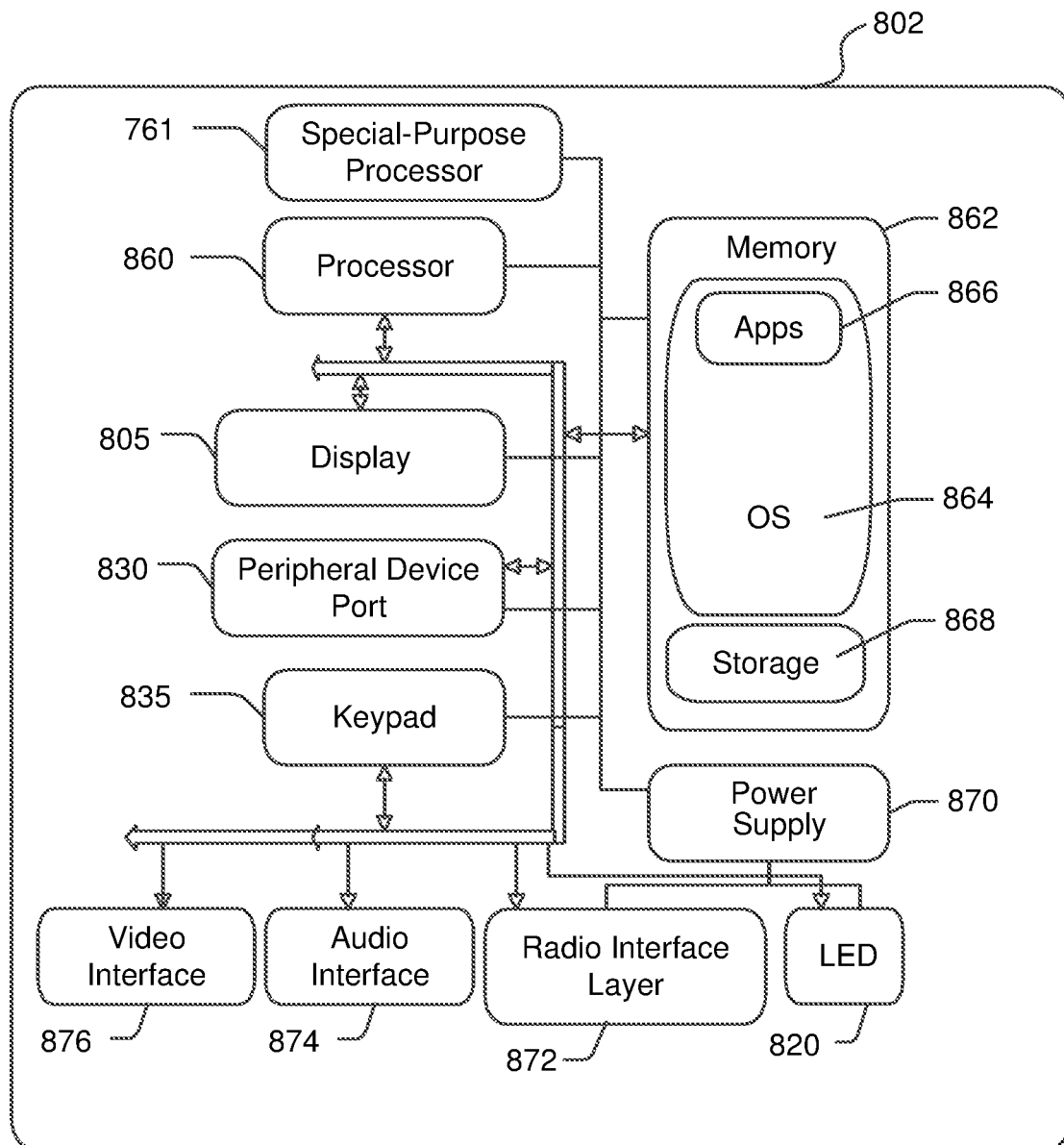
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., a user of the client device 104A, a user using the client device 104B to edit dialog, operating the dialog processor 102 as shown in the system 100 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., a dialog processor 102 as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of devices connected to a peripheral device port 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for determining a response to a query in a dialog according to at least the examples provided in the sections below. The method comprises receiving a query, wherein the query is a part of a dialog associated with a task; predicting, based on the query, a first candidate response to the query using a dialog embedding associated with a first model, wherein the first model includes a data-driven, pre-trained generative model; predicting, based on the query, a second candidate response to the query using a second model, wherein the second model includes a classifier; determining, based on a combination of the first candidate response and the second candidate response, a response to the query; and transmitting the response as a next action in the dialog. The method further comprises pre-training the first model using dialog corpora, wherein the dialog corpora includes a plurality of dialog data associated with a plurality of tasks, and wherein the first model includes a transformer; generating, based on the pre-trained first model, the dialog embedding; and generating, based on a combination of the query and the dialog embedding, the first candidate response to the query. The method further comprises receiving a dialog tree, wherein the dialog tree includes at least one of a rule or a condition associated with the task, and wherein the dialog tree is editable; training, using the at least one of a rule or a condition associated with the task, the second model; and generating, based on a combination of the query and the at least one of the rule or the condition associated with the task, the second candidate response. The first model includes at least part of a transformer. The second model includes at least a rule and a condition associated with the task. The method further comprises extracting one or more rules from the query, wherein the one or more rules include one or more of: an available action, a property, an entity, a bag of words, a last action, and a new dialog; and generating, based on the one or more rules, the second candidate response to the query using the second model. The dialog embedding includes a transformer-based dialog embedding, wherein the transformer-based dialog embedding is based on dialog history data for a plurality of tasks, and wherein the second model is specific to the task. The rule or condition associated with the task are interactively generated based on machine teaching.

Another aspect of the technology relates to a system for generating a response to a query in a dialog. The system comprises a processor; and a memory storing computer-executable instructions that when executed by the processor cause the system to: receive the query, wherein the query is a part of a dialog associated with a task; predict, based on the query, a first candidate response to the query using a dialog embedding associated with a first model, wherein the first model includes a data-driven, pre-trained generative model; predict, based on the query, a second candidate response to the query using a second model, wherein the second model includes a classifier; determine, based on a combination of the first candidate response and the second candidate response, the response to the query; and transmit the response as a next action in the dialog. The computer-executable instructions when executed by the processor further cause the system to: pre-train the first model using dialog corpora, wherein the dialog corpora includes a plurality of dialog data associated with a plurality of tasks, and wherein the first model includes a transformer; generate, based on the pre-trained first model, the dialog embedding; and generate, based on a combination of the query and the dialog embedding, the first candidate response to the query. The computer-executable instructions when executed by the processor further cause the system to: receive a dialog tree, wherein the dialog tree includes at least one of a rule or a condition associated with the task, and wherein the dialog tree is editable; train, using the at least one of a rule or a condition associated with the task, the second model; and generate, based on a combination of the query and the at least one of the rule or the condition associated with the task, the second candidate response. The first model includes at least part of a transformer. The second model includes at least a rule and a condition associated with the task. The computer-executable instructions when executed by the processor further cause the system to: extract one or more rules from the query, wherein the one or more rules include one or more of: an available action, a property, an entity, a bag of words, a last action, and a new dialog; and generate, based on the one or more rules, the second candidate response to the query using the second model. The dialog embedding includes a transformer-based dialog embedding, wherein the transformer-based dialog embedding is based on dialog history data for a plurality of tasks, and wherein the second model is specific to the task. The rule or condition associated with the task are interactively generated based on machine teaching.

In still further aspects, the technology relates to a computer-implemented method. The method comprises receiving a query, wherein the query is a part of a dialog associated with a task; extracting one or more entities from the received query; retrieving, based on the query, one or more rule-based properties of the task, wherein the one or more rule-based properties include an available action; predicting, based on the query, a first candidate response to the query using a dialog embedding associated with a first model, wherein the first model includes a data-driven, pre-trained generative model; predicting, based on the query, a second candidate response to the query using a second model, wherein the second model includes a classifier; determining, based on a combination of the first candidate response and the second candidate response, a response to the query; and transmitting the response as a next action in the dialog. The method further comprises pre-training the first model using dialog corpora, wherein the dialog corpora includes a plurality of dialog data associated with a plurality of tasks, and wherein the first model includes a transformer; generating, based on the pre-trained first model, the dialog embedding; generating, based on a combination of the query and the dialog embedding, the first candidate response to the query; receiving a dialog tree, wherein the dialog tree includes at least one of a rule or a condition associated with the task, and wherein the dialog tree is editable; training, using the at least one of a rule or a condition associated with the task, the second model; and generating, based on a combination of the query and the at least one of the rule or the condition associated with the task, the second candidate response. The method further comprises pre-training the first model using dialog corpora, wherein the dialog corpora includes a plurality of dialog data associated with a plurality of tasks, and wherein the first model includes a transformer; generating, based on the pre-trained first model, the dialog embedding; generating, based on a combination of the query and the dialog embedding, the first candidate response to the query; receiving a dialog tree, wherein the dialog tree includes at least one of a rule or a condition associated with the task, and wherein the dialog tree is editable; training, using the at least one of a rule or a condition associated with the task, the second model; and generating, based on a combination of the query and the at least one of the rule or the condition associated with the task, the second candidate response. The combination of the first candidate response and the second candidate response includes a weighted sum among the available action associated with the task and aspects of the first candidate response and the second candidate response. The method further includes generating, based on the first candidate response and the second candidate response, a ranked list of candidate responses; and determining, based on the ranked list, the response to the query.

Any of the one or more above aspects in combination with any other of the one or more aspect. Any of the one or more aspects as described herein.

What is claimed is:

1. A computer-implemented method, the method comprising:
    receiving a query, wherein the query is a part of a dialog representing at least a part of a task;
    predicting, based on the query, a first candidate response to the query using a dialog embedding of a first model, wherein the first model includes a data-driven, pre-trained generative model;

predicting, based on the query and the task, a second candidate response to the query using a second model, wherein the second model includes a classifier, and the classifier determines the second candidate response by using a set of predetermined rules of the task;

determining, based on a combination of the first candidate response and the second candidate response, a third candidate response to the query; and transmitting the third candidate response as a next action in the dialog.

2. The computer-implemented method according to claim 1, the method further comprising:

pre-training the first model using dialog corpora, wherein the dialog corpora include a plurality of dialog data associated with a plurality of tasks, and wherein the first model includes a transformer;

generating, based on the pre-trained first model, the dialog embedding; and generating, based on a combination of the query and the dialog embedding, the first candidate response to the query.

3. The computer-implemented method according to claim 1, the method further comprising:

receiving a dialog tree, wherein the dialog tree includes at least one of a rule or a condition associated with the task, and wherein the dialog tree is editable;

training, using the at least one of a rule or a condition associated with the task, the second model; and generating, based on a combination of the query and the at least one of the rule or the condition associated with the task, the second candidate response.

4. The computer-implemented method according to claim 1, wherein the first model includes at least part of a transformer.

5. The computer-implemented method according to claim 1, wherein the second model includes at least a rule and a condition associated with the task.

6. The computer-implemented method according to claim 1, the method further comprising:

extracting one or more rules from the query, wherein the one or more rules include one or more of: an available action, a property, an entity, a bag of words, a last action, and a new dialog; and generating, based on the one or more rules, the second candidate response to the query using the second model.

7. The computer-implemented method according to claim 1, wherein the dialog embedding includes a transformer-based dialog embedding, wherein the transformer-based dialog embedding is based on dialog history data for a plurality of tasks, and wherein the second model is specific to the task.

8. The computer-implemented method according to claim 3, wherein the rule or condition associated with the task are interactively generated based on machine teaching.

9. A system for responding to a query in a dialog, the system comprising:

a processor; and a memory storing computer-executable instructions that when executed by the processor cause the system to:

receive the query, wherein the query is a part of a dialog representing at least a part of a task;

predict, based on the query, a first candidate response to the query using a dialog embedding of a first model, wherein the first model includes a data-driven, pre-trained generative model;

predict, based on the query and the task, a second candidate response to the query using a second model, wherein the second model includes a classifier, and the classifier determines the second candidate response by using a set of predetermined rules of the task;

determine, based on a combination of the first candidate response and the second candidate response, a third candidate response to the query; and transmit the third candidate response as a next action in the dialog.

10. The system of claim 9, the computer-executable instructions when executed by the processor further cause the system to:

pre-train the first model using dialog corpora, wherein the dialog corpora include a plurality of dialog data associated with a plurality of tasks, and wherein the first model includes a transformer;

generate, based on the pre-trained first model, the dialog embedding; and generate, based on a combination of the query and the dialog embedding, the first candidate response to the query.

11. The system of claim 9, the computer-executable instructions when executed by the processor further cause the system to:

receive a dialog tree, wherein the dialog tree includes at least one of a rule or a condition associated with the task, and wherein the dialog tree is editable;

train, using the at least one of a rule or a condition associated with the task, the second model; and generate, based on a combination of the query and the at least one of the rule or the condition associated with the task, the second candidate response.

12. The system of claim 9, wherein the first model includes at least part of a transformer.

13. The system of claim 9, wherein the second model includes at least a rule and a condition associated with the task.

14. The system of claim 9, the computer-executable instructions when executed by the processor further cause the system to:

extract one or more rules from the query, wherein the one or more rules include one or more of: an available action, a property, an entity, a bag of words, a last action, and a new dialog; and generate, based on the one or more rules, the second candidate response to the query using the second model.

15. The system of claim 9, wherein the dialog embedding includes a transformer-based dialog embedding, wherein the transformer-based dialog embedding is based on dialog history data for a plurality of tasks, and wherein the second model is specific to the task.

16. The system of claim 9, wherein the rule or condition associated with the task are interactively generated based on machine teaching.

17. A computer-implemented method, the method comprising:

receiving a query, wherein the query is a part of a dialog representing at least a part of a task;

extracting one or more entities from the received query;

retrieving, based on the query, one or more rule-based properties of the task, wherein the one or more rule-based properties include an available action;

predicting, based on the query, a first candidate response to the query using a dialog embedding of a first model, wherein the first model includes a data-driven, pre-trained generative model;

predicting, based on the query and the task, a second candidate response to the query using a second model, wherein the second model includes a classifier, and the classifier determines the second candidate response by using a set of predetermined rules of the task;

determining, based on a combination of the first candidate response and the second candidate response, a third candidate response to the query; and transmitting the third candidate response as a next action in the dialog.

18. The computer-implemented method of claim 17, the method further comprising:

pre-training the first model using dialog corpora, wherein the dialog corpora include a plurality of dialog data associated with a plurality of tasks, and wherein the first model includes a transformer;

generating, based on the pre-trained first model, the dialog embedding;

generating, based on a combination of the query and the dialog embedding, the first candidate response to the query;

receiving a dialog tree, wherein the dialog tree includes at least one of a rule or a condition associated with the task, and wherein the dialog tree is editable;

training, using the at least one of a rule or a condition associated with the task, the second model; and generating, based on a combination of the query and the at least one of the rule or the condition associated with the task, the second candidate response.

19. The computer-implemented method of claim 17, wherein the combination of the first candidate response and the second candidate response includes a weighted sum among the available action associated with the task and aspects of the first candidate response and the second candidate response.

20. The computer-implemented method of claim 17, the method further includes:

generating, based on the first candidate response and the second candidate response, a ranked list of candidate responses; and determining, based on the ranked list, the response to the query.

* * * * *